(12) United States Patent
Matsukuma et al.

(10) Patent No.: US 11,319,876 B2
(45) Date of Patent: May 3, 2022

(54) COMPRESSED AIR ENERGY STORAGE POWER GENERATION APPARATUS

(71) Applicant: KABUSHIKI KAISHA KOBE SEIKO SHO (KOBE STEEL, LTD.), Hyogo (JP)

(72) Inventors: Masaki Matsukuma, Takasago (JP); Ayaka Nagahira, Takasago (JP)

(73) Assignee: KOBE STEEL, LTD., Hyogo (JP)

( * ) Notice: Subject to any disclaimer, the term of this patent is extended or adjusted under 35 U.S.C. 154(b) by 363 days.

(21) Appl. No.: 16/630,815

(22) PCT Filed: Jul. 2, 2018

(86) PCT No.: PCT/JP2018/025030
§ 371 (c)(1),
(2) Date: Jan. 13, 2020

(87) PCT Pub. No.: WO2019/026507
PCT Pub. Date: Feb. 7, 2019

(65) Prior Publication Data
US 2021/0017905 A1    Jan. 21, 2021

(30) Foreign Application Priority Data
Aug. 1, 2017   (JP) .............................. JP2017-148938

(51) Int. Cl.
*F02C 6/16*          (2006.01)
*F02C 1/02*          (2006.01)
(Continued)

(52) U.S. Cl.
CPC .................. *F02C 6/16* (2013.01); *F02C 1/02* (2013.01); *H02J 7/345* (2013.01); *H02J 15/006* (2013.01);
(Continued)

(58) Field of Classification Search
CPC ...... F02C 6/16; F02C 1/02; H02J 7/345; H02J 15/006; F05D 2220/76; F05D 2260/42
See application file for complete search history.

(56) References Cited

U.S. PATENT DOCUMENTS

2017/0159649 A1   6/2017 Sakamoto et al.
2018/0156110 A1   6/2018 Matsukuma et al.
2018/0283275 A1   10/2018 Matsukuma et al.

OTHER PUBLICATIONS

International Search Report issued in PCT/JP2018/025030; dated Aug. 28, 2018.

(Continued)

*Primary Examiner* — Carlos Amaya
(74) *Attorney, Agent, or Firm* — Studebaker & Brackett PC (57) ABSTRACT

A compressed air energy storage power generation apparatus includes a power demand receiving unit that receives a power demand value of a consumer facility. The apparatus includes a first air supply valve that adjusts a flow rate of compressed air to be supplied from a low-pressure tank to an expander, a second air supply valve that adjusts a flow rate of compressed air to be supplied from a high-pressure tank to the expander, and a control device configured to open the first air supply valve according to the power demand value in a state where the second air supply valve is closed when the power demand value is less than a predetermined threshold, and to open the second air supply valve according to the power demand value when the power demand value is equal to or greater than the predetermined threshold.

10 Claims, 4 Drawing Sheets

(51) Int. Cl.
*H02J 7/34* (2006.01)
*H02J 15/00* (2006.01)
(52) U.S. Cl.
CPC ...... *F05D 2220/32* (2013.01); *F05D 2220/76* (2013.01); *F05D 2260/42* (2013.01)

(56) References Cited

OTHER PUBLICATIONS

Notification of Transmittal of Translation of the International Preliminary Report on Patentability and Translation of Written Opinion of the International Searching Authority; PCT/JP2018/025030; dated Feb. 13, 2020.

COMPRESSED AIR ENERGY STORAGE POWER GENERATION APPARATUS

CROSS-REFERENCE TO RELATED APPLICATIONS

This is a national phase application in the United States of International Patent Application No. PCT/JP2018/025030 with an international filing date of Jul. 2, 2018, which claims priority of Japanese Patent Application No. 2017-148938 filed on Aug. 1, 2017 the contents of which are incorporated herein by reference.

TECHNICAL FIELD

The present invention relates to a compressed air energy storage power generation apparatus.

BACKGROUND ART

Since power generation using renewable energy such as wind power generation and solar power generation depends on weather conditions, the output may not be stable. Therefore, it is necessary to use an energy storage system in order to obtain necessary power in a timely manner. As an example of such a system, for example, a compressed air energy storage (CAES) power generation system is known.

The CAES power generation system is a system that drives a compressor by using renewable energy to produce compressed air, stores the compressed air in a tank or the like, and drives a turbine generator by using the compressed air as necessary to obtain power. Such a CAES power generation system is disclosed in JP 2016-34211 A, for example.

SUMMARY OF THE INVENTION

JP 2016-34211 A discloses a configuration of a general CAES power generation system, but does not discuss the details for a supply method and a supply destination of the power generated by the CAES power generation system. In particular, depending on the aspect of the consumer facility, it may be necessary to temporarily supply a large amount of power. For example, the consumer facility such as a supercomputer or an electric furnace temporarily consumes a large amount of power according to the type or process of jobs to be processed. However, the CAES power generation system of JP 2016-34211 A does not have a configuration responding to such a request for a temporarily large amount of power, and neither discloses nor suggests an operation method corresponding to such a power request.

An object of the present invention is to provide a compressed air energy storage power generation apparatus that can respond to a request for a temporarily large amount of power from a consumer facility.

A compressed air energy storage power generation apparatus of the invention is configured to store input power in a form of compressed air, generate power by using the compressed air as necessary, and supply power to a consumer facility, and the compressed air energy storage power generation apparatus includes a power demand receiving unit that receives a power demand value of the consumer facility; an electric motor that is driven by the input power; a first compressor that is driven by the electric motor; a first accumulation unit and a second accumulation unit that store the compressed air compressed by the first compressor; an expander that is driven by the compressed air supplied from the first accumulation unit or the second accumulation unit; a generator that is driven by the expander; a first air supply valve that adjusts a flow rate of the compressed air to be supplied from the first accumulation unit to the expander; a second air supply valve that adjusts a flow rate of the compressed air to be supplied from the second accumulation unit to the expander; and a control device configured to open the first air supply valve according to the power demand value in a state where the second air supply valve is closed when the power demand value is less than a predetermined threshold, and to open the second air supply valve according to the power demand value when the power demand value is equal to or greater than the predetermined threshold.

With the configuration, energy of which the output fluctuates irregularly, such as renewable energy, can be stored as the compressed air in the first accumulation unit and the second accumulation unit, and power can be generated by supplying the compressed air to the expander as necessary and driving the generator. Further, since the power demand value is received from the consumer facility by the power demand receiving unit, it is possible to grasp a request for a temporarily large amount of power from the consumer facility in a timely manner. Therefore, at the normal time, that is, when the power demand value is less than the predetermined threshold, it is possible to generate a required amount of power by adjusting the opening degree of the first air supply valve and supplying a required amount of compressed air from the first accumulation unit to the expander. Further, when there is a request for a temporarily large amount of power, that is, when the power demand value is equal to or greater than the predetermined threshold, it is possible to temporarily generate a large amount of power since a required amount of compressed air can be supplied from the second accumulation unit to the expander by adjusting the opening degree of the second air supply valve. Accordingly, it is possible to respond to the request for a temporarily large amount of power from the consumer facility by using the compressed air energy storage (CAES) power generation apparatus. Here, the predetermined threshold of the power demand value is the maximum value of power that can be generated by the compressed air supplied from the first accumulation unit to the expander.

Further, with this configuration, given a case where the power demand value of the consumer facility fluctuates, particularly given a case where the power demand value is increased only for a short time (for example, several minutes to several tens of minutes in one day), it is uneconomical to set contract power based on the increased power demand value. However, it is possible to set lower contract power by supplying power from the CAES power generation apparatus in a timely manner in response to the increase in the power demand value in the short time. Accordingly, it is also useful from an economical viewpoint. Further, the CAES power generation apparatus is excellent in environmental performance because it does not discharge environmentally hazardous substances, and has a long service life and excellent durability compared to other power generation facilities.

The compressed air energy storage power generation apparatus may further include a second compressor that performs compression up to a higher pressure than a pressure of the first compressor, in which the second accumulation unit has a higher allowable pressure than an allowable pressure of the first accumulation unit, and stores the compressed air compressed by the second compressor.

With the configuration, it is possible to produce high-pressure compressed air by the second compressor and store this high-pressure compressed air in the second accumulation unit. Accordingly, it is possible to supply the high-pressure compressed air from the second accumulation unit to the expander, and to generate more power.

The compressed air energy storage power generation apparatus may further include a pressure detection unit that detects an internal pressure of the second accumulation unit; and an engine generator that generates power by using fuel, in which the control device may be configured to supply power from the capacitor to the consumer facility according to the power demand value when the power demand value is equal to or greater than the predetermined threshold and when the internal pressure of the second accumulation unit is equal to or lower than a predetermined pressure value, and supply power to the consumer facility by driving the engine generator according to the power demand value when the power demand value is equal to or greater than the predetermined threshold, when the internal pressure of the second accumulation unit is equal to or lower than the predetermined pressure value, and when the power stored in the capacitor is equal to or lower than a predetermined power value.

With the configuration, even when the compressed air in the second accumulation unit is exhausted and a large amount of power cannot be generated temporarily, it is possible to supply power supplementarily from the capacitor to the consumer facility. Furthermore, even when the stored power of the capacitor is exhausted and the power cannot be supplied supplementarily, it is possible to generate power by the engine generator and to supply the power supplementarily to the consumer facility. Here, the predetermined pressure value indicates a pressure value approximately equal to the internal pressure of the low-pressure tank that is set to be allowed. Further, the predetermined power value indicates a power value at which power can be sufficiently supplied from the capacitor to the consumer facility.

The first air supply valve and the second air supply valve may be flow regulating valves, and the control device may adjust a power generation amount of the generator by adjusting opening degrees of the first air supply valve and the second air supply valve according to the power demand value.

With the configuration, since the opening degrees of the first air supply valve and the second air supply valve are adjusted according to the power demand value, it is possible to generate an amount of power required by the consumer facility in a timely manner.

The compressed air energy storage power generation apparatus may further include a rotational speed changing device that changes a rotational speed of the generator, in which the control device may adjust a power generation amount of the generator by adjusting the rotational speed of the generator by the rotational speed changing device according to the power demand value.

With the configuration, since the rotational speed of the generator is adjusted by the rotational speed changing device according to the power demand value, it is possible to generate an amount of power required by the consumer facility in a timely manner.

A plurality of expanders may be provided, the compressed air energy storage power generation apparatus may further include a number-of-operating-units changing device that changes the number of expanders to be operated, and the control device may adjust a power generation amount of the generator by adjusting the number of expanders to, be driven, by the number-of-operating-units changing device according to the power demand value.

With the configuration, since the number of expanders to be driven is adjusted by the number-of-operating-units changing device according to the power demand value, it is possible to generate an amount of power required by the consumer facility in a timely manner.

According to the invention, it is possible to respond to a request for a temporarily large amount of power by using a compressed air energy storage power generation apparatus.

MODE FOR CARRYING OUT THE INVENTION

Hereinafter, embodiments of the present invention will be described with reference to the accompanying drawings.

First Embodiment

Figure 1:
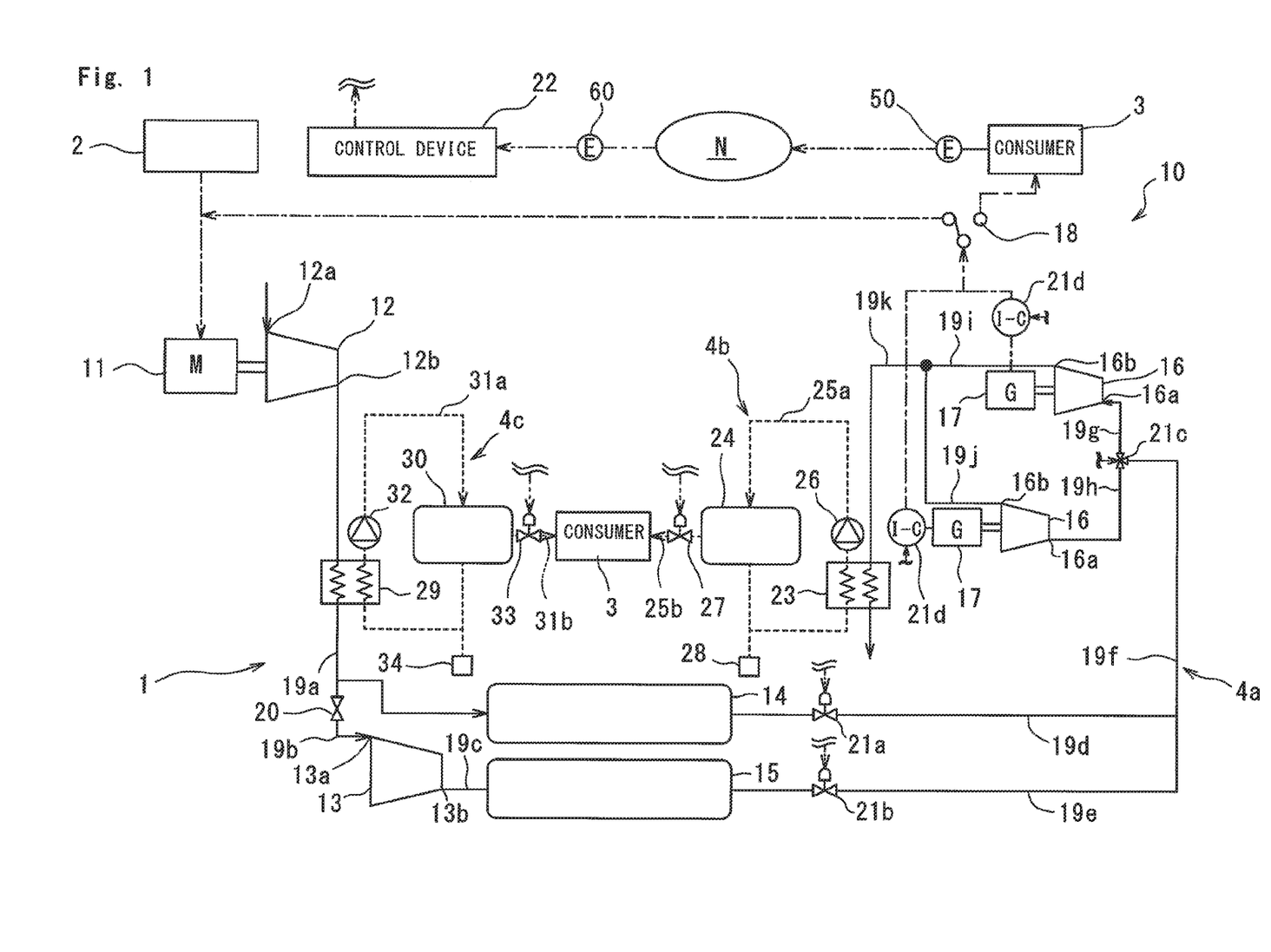
FIG. 1 is a schematic configuration diagram of a compressed air energy storage power generation apparatus according to a first embodiment of the present invention.

A compressed air energy storage (CAES) power generation system 1 shown in FIG. 1 is a system that stores power generated by a power generation apparatus 2 using renewable energy such as wind power generation or solar power generation, in a form of compressed air, and generates power using the compressed air as necessary, to supply power to a consumer facility 3 in a timely manner. Furthermore, the CAES power generation system 1 can also supply cold heat and hot heat generated in the system to the consumer facility 3. Here, the aspect of the consumer facility 3 can be various aspects, for example, each home, a factory, an electric furnace, or a supercomputer of a data center. Here, in FIG. 1, two consumer facilities 3 are shown, but the two consumer facilities 3 are the same. However, a plurality of consumer facilities 3 may be provided.

The CAES power generation system 1 includes a CAES power generation apparatus 10, and a power demand detection unit 50 that can transmit data to the CAES power generation apparatus 10 via a communication network N.

The CAES power generation apparatus 10 includes a power generation line 4a that generates power using the compressed air, a cold heat line 4b that takes out cold heat using the cold air exhausted from an expander 16, and a hot heat line 4c that takes out hot heat using high-temperature air discharged from a first compressor 12. Hereinafter, these three lines will be described in order.

First, the power generation line 4a will be described. In the power generation line 4a, the a CAES power generation apparatus 10 includes a motor (electric motor) 11, the first compressor 12, a second compressor 13, a low-pressure tank (first accumulation unit) 14, and a high-pressure tank (second accumulation unit) 15, the expander 16, a generator 17, and a switch 18.

The power generated by the power generation apparatus 2 that uses renewable energy is supplied to the motor 11. Hereinafter, the power supplied from the power generation apparatus 2 to the motor 11 is referred to as input power. The motor 11 is mechanically connected to the first compressor 12, and is driven by the input power to operate the first compressor 12.

The first compressor 12 of the embodiment is a screw type. Since the screw-type first compressor 12 can control the rotational speed, the first compressor 12 can follow the input power that fluctuates irregularly, with good responsiveness, and is preferable as a component of the CAES power generation apparatus 10. However, the type of the first compressor 12 is not particularly limited, and may be a scroll type, a turbo type, a reciprocating type, or the like other than the screw type.

When the first compressor 12 is driven by the motor 11, the first compressor 12 sucks air from an inlet port 12a, compresses the air, and discharges the compressed air from a discharge port 12b. The discharge port 12b of the first compressor 12 is fluidly connected to the low-pressure tank 14 through an air pipe 19a, and the compressed air discharged from the discharge port 12b is pumped to the low-pressure tank 14 through the air pipe 19a. Further, an air pipe 19b branches from the middle of the air pipe 19a. The air pipe 19b is fluidly connected to an inlet port 13a of the second compressor 13, and the compressed air discharged from the first compressor 12 can be supplied to the second compressor 13 through the air pipe 19b. A suction valve 20 is interposed in the air pipe 19b, and the supply of the compressed air from the first compressor 12 to the second compressor 13 can be allowed or blocked by the suction valve 20.

The second compressor 13 sucks air from the inlet port 13a, compresses the air, and discharges the compressed air from a discharge port 13b. The discharge pressure of the second compressor 13 is higher than the discharge pressure of the first compressor 12. The discharge port 13b of the second compressor 13 is fluidly connected to the high-pressure tank 15 through an air pipe 19c, and the compressed air discharged from the discharge port 13b is pumped to the high-pressure tank 15 through the air pipe 19c. Here, the type of the second compressor 13 is not particularly limited, and for example, the same type as that of the first compressor 12 can be used.

The low-pressure tank 14 is a steel tank, for example, and stores the compressed air pumped from the first compressor 12. The high-pressure tank 15 is a steel tank, for example, and stores the compressed air pumped from the second compressor 13. The high-pressure tank 15 is designed to have a higher allowable pressure than an allowable pressure of the low-pressure tank 14. The low-pressure tank 14 and the high-pressure tank 15 are fluidly connected to an air supply port 16a of the expander 16 through air pipes 19d and 19e, respectively. In detail, the air pipes 19d and 19e are joined to an air pipe 19f on the way, and the air pipe 19f branches into two hands (air pipes 19g and 19h) via a switching valve 21c to be fluidly connected to two expanders 16, respectively. Accordingly, the compressed air in the low-pressure tank 14 and the compressed air in the high-pressure tank 15 are supplied to the two expanders 16 through the air pipes 19d to 19h, respectively. A first air supply valve 21a and a second air supply valve 21b, which are flow regulating valves, are interposed in the air pipes 19d and 19e, respectively. The opening degrees of the first air supply valve 21a and the second air supply valve 21b are controlled by a control device 22 described later. The switching valve 21c is an example of a number-of-operating-units changing device.

The two expanders 16 of the embodiment are the same and are the screw-type expanders. Since the screw-type expander 16 can control the rotational speed, the expander 16 is preferable as a component of the CAES power generation apparatus 10, similar to the screw-type first compressor 12. However, the type of the expander 16 is not particularly limited, and may be a scroll type, a turbo type, a reciprocating type, or the like other than the screw type.

The expander 16 is mechanically connected to the generator 17. Therefore, the expander 16 is operated by the compressed air supplied from the air supply port 16a to drive the generator 17. That is, the compressed air stored in the low-pressure tank 14 and the high-pressure tank 15 is expanded and used for power generation. The expanded air is exhausted from the exhaust ports 16b through air pipes 19i and 19j. The air pipes 19i and 19j are joined to an air pipe 19k and are fluidly connected to a first heat exchanger 23.

The generator 17 is electrically connected to the consumer facility 3 and the motor 11 via the switch 18. Normally, the power generated by the generator 17 is supplied to the consumer facility 3, but can be supplied to the motor 11 by switching the switch 18. Hereinafter, the power supplied from the generator 17 to the consumer facility 3 is referred to as output power, and the power supplied to the motor 11 is referred to as return power. In particular, since power generation using renewable energy by the power generation apparatus 2 is unstable, it is effective that return power can be obtained by switching the switch 18 when the power to be supplied to the motor 11 cannot be obtained. Further, an inverter 21d is electrically connected to the generator 17, and the rotational speed of the generator 17 can be adjusted by the inverter 21d. The inverter 21d of the embodiment also has a function as a converter, and the output power is supplied to the consumer facility 3 after being converted into desired voltage and frequency including DC/AC conversion by the inverter 21d. The inverter 21d is controlled by the control device 22 as will be described later. The inverter 21d is an example of a rotational speed changing device.

The power demand detection unit 50 is attached to the consumer facility 3, and detects the power required by the consumer facility 3. The power demand detection unit 50 can detect a demand for a temporarily large amount of power such as outage information in the consumer facility 3 or job information or process information that consumes a large amount of power when the consumer facility 3 is a supercomputer or an electric furnace. In addition to these, the aspect of the power demand detection unit 50 is not particularly limited, and for example, the power demand detection unit 50 may calculate a power demand value from the amount of power used in each home or the amount of power used in a factory.

The CAES power generation apparatus 10 includes a power demand receiving unit 60 corresponding to the power demand detection unit 50. Accordingly, the power demand value is transmitted from the power demand detection unit 50 to the power demand receiving unit 60 via the communication network N, and is used for the control, which will be described later, in the control device 22.

Next, the cold heat line 4b will be described. In the cold heat line 4b, the CAES power generation apparatus 10 includes the first heat exchanger 23 and a first heat medium storage unit 24. The first heat exchanger 23 and the first heat medium storage unit 24 are fluidly connected through a heat medium pipe 25a, and a first heat medium circulates between them through the heat medium pipe 25a. The heat medium pipe 25a is provided with a pump 26 for circulating the first heat medium. The type of the first heat medium is not particularly limited, and can be, for example, heat-transfer oil or water.

The first heat exchanger 23 is fluidly connected to the exhaust ports 16b of the expanders 16 through the air pipes 19i, 19j, and 19k, and the air exhausted from the exhaust ports 16b of the expanders 16 is supplied to the first heat exchanger 23 through the air pipes 19i, 19j, and 19k. Here, the air exhausted from the exhaust ports 16b of the expanders 16 is cold air at room temperature or lower because the heat of the air is absorbed when the air is expanded by the expander 16. In the embodiment, the air exhausted from the exhaust ports 16b of the expanders 16 is cold air of about −50° C., for example.

In the first heat exchanger 23, heat is exchanged between the cold air in the air pipe 19k and the first heat medium at room temperature in the heat medium pipe 25a. Specifically, in the first heat exchanger 23, the air in the air pipe 19k is heated, and the first heat medium in the heat medium pipe 25a is cooled. In the embodiment, the air in the air pipe 19k heated in the first heat exchanger 23 is, for example, about 20° C., and the first heat medium in the heat medium pipe 25a cooled in the first heat exchanger 23 is, for example, about 5° C. After the heat exchange in the first heat exchanger 23, the air heated in the first heat exchanger 23 is exhausted to the atmosphere, and the first heat medium cooled in the first heat exchanger 23 is supplied to the first heat medium storage unit 24 through the heat medium pipe 25a and stored in the first heat medium storage unit 24.

The first heat medium storage unit 24 is, for example, a cold water pool, and is preferably insulated from the outside so as not to release cold heat to the outside. The first heat medium storage unit 24 is fluidly connected to the consumer facility 3 through a heat medium pipe 25b, and a cold-heat supply regulating valve 27 that is a flow regulating valve interposed in the heat medium pipe 25b. Therefore, the first heat medium stored in the first heat medium storage unit 24 is supplied to the consumer facility 3 according to the opening degree of the cold-heat supply regulating valve 27. Note that when the first heat medium is supplied to the consumer facility 3, since the circulation amount of the first heat medium in the heat medium pipe 25a is decreased, the first heat medium is supplied to the heat medium pipe 25a by a heat medium supply mechanism 28 for compensating the decrease of the circulation amount.

Next, the hot heat line 4c will be described. In the hot heat line 4c, the CAES power generation apparatus 10 includes a second heat exchanger 29 and a second heat medium storage unit 30. The second heat exchanger 29 and the second heat medium storage unit 30 are fluidly connected through a heat medium pipe 31a, and a second heat medium circulates between them through the heat medium pipe 31a. The heat medium pipe 31a is provided with a pump 32 for circulating the second heat medium. The type of the second heat medium is not particularly limited, and can be, for example, heat-transfer oil or water.

The second heat exchanger 29 is interposed in the air pipe 19a extending from the discharge port 12b of the first compressor 12 to the low-pressure tank 14. The compressed air discharged from the discharge port 12b of the first compressor 12 is high-temperature air at room temperature or higher because the temperature of the air is increased by the compression heat when the air is compressed by the first compressor 12. In the embodiment, the compressed air discharged from the discharge port 12b of the first compressor 12 is warm air of about 150° C., for example.

In the second heat exchanger 29, heat is exchanged between the high-temperature air in the air pipe 19a and the second heat medium at room temperature in the heat medium pipe 31a. Specifically, in the second heat exchanger 29, the air in the air pipe 19a is cooled, and the second heat medium in the heat medium pipe 31a is heated. In the embodiment, the air in the air pipe 19a cooled in the second heat exchanger 29 is, for example, about 50° C., and the second heat medium heated in the second heat exchanger 29 is, for example, about 90° C. After the heat exchange in the second heat exchanger 29, the air cooled in the second heat exchanger 29 is supplied to and stored in the low-pressure tank 14 or the high-pressure tank 15, and the second heat medium heated in the second heat exchanger 29 is supplied to the second heat medium storage unit 30 through the heat medium pipe 31a and stored in the second heat medium storage unit 30.

The second heat medium storage unit 30 is, for example, a hot water pool, and is preferably insulated from the outside so as not to release the hot heat to the outside. The second heat medium storage unit 30 is fluidly connected to the consumer facility 3 through a heat medium pipe 31b, and a hot-heat supply regulating valve 33 that is a flow regulating valve is interposed in the heat medium pipe 31b. The hot-heat supply regulating valve 33 is controlled by the control device 22 as will be described later. Therefore, the second heat medium stored in the second heat medium storage unit 30 is supplied to the consumer facility 3 according to the control of the control device 22. Note that when the second heat medium is supplied to the consumer facility 3, since the circulation amount of the second heat medium in the heat medium pipe 31a is decreased, the second heat medium is supplied to the heat medium pipe 31a by a heat medium supply mechanism 34 for compensating the decrease of the circulation amount.

Figure 2:
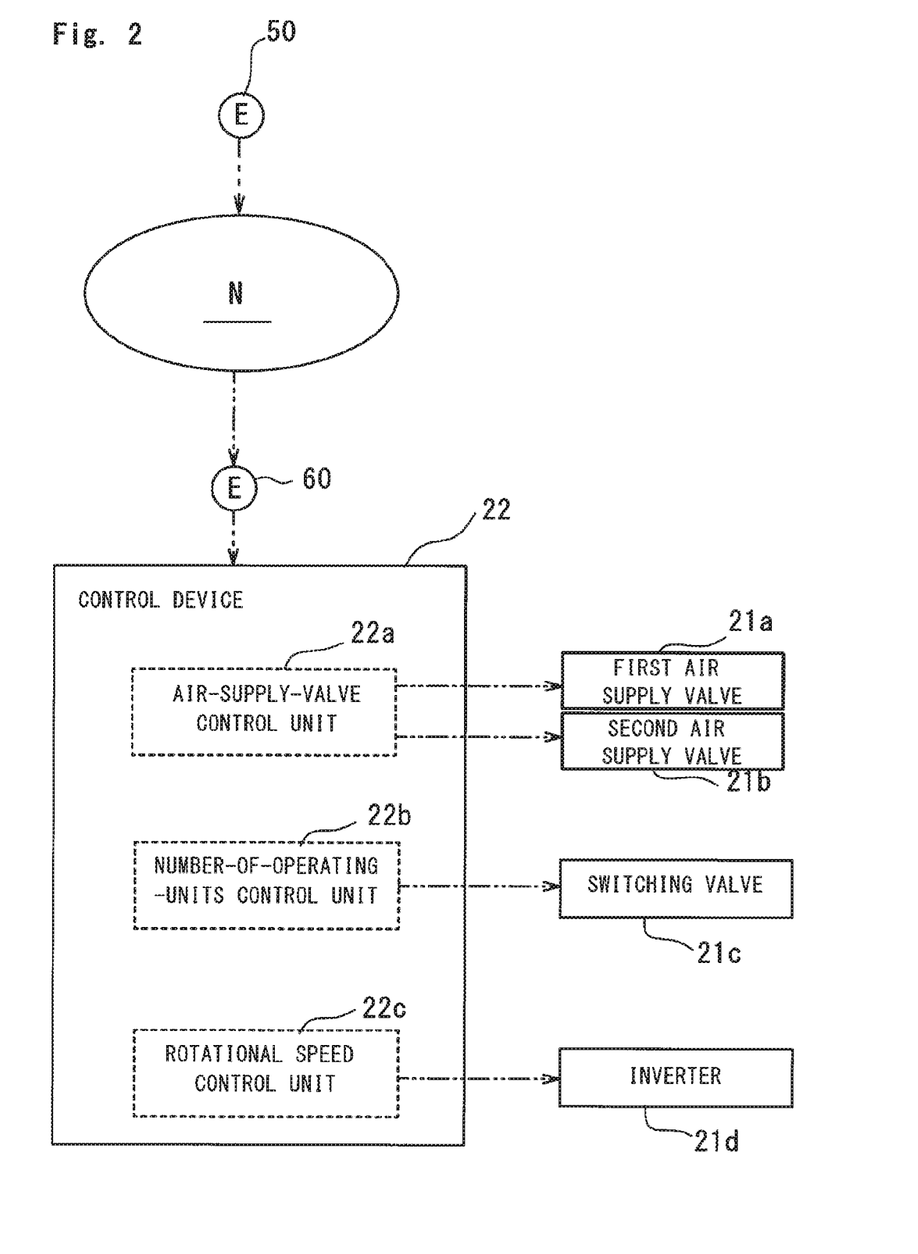
FIG. 2 is a control block diagram of the compressed air energy storage power generation apparatus according to a first embodiment.

Referring also to FIG. 2, the CAES power generation apparatus 10 includes the control device 22. The control device 22 is constructed by hardware including a storage device such as a central processing unit (CPU), a random access memory (RAM), and a read only memory (ROM), and software installed therein. The control device 22 receives the power demand value from the power demand receiving unit 60, and controls at least the first air supply valve 21a, the second air supply valve 21b, the switching valve 21c, and the inverter 21d. Specifically, the control device 22 includes an air-supply-valve control unit 22a that controls the first air supply valve 21a and the second air supply valve 21b, a number-of-operating-units control unit 22b that controls the switching valve 21c, and a rotational speed control unit 22c that controls the inverter 21d.

The air-supply-valve control unit 22a adjusts the opening degrees of the first air supply valve 21a and the second air supply valve 21b according to the power demand value detected by the power demand detection unit 50 to drive the expander 16 and the generator 17. Specifically, when the power demand value is less than a predetermined threshold, the air-supply-valve control unit 22a adjusts the opening degree of the first air supply valve 21a according to the power demand value in a state where the second air supply valve 21b is closed, and drives the expander 16 by the compressed air in the low-pressure tank 14 to generate the required amount of power. Further, when the power demand value is equal to or greater than the predetermined threshold, the air-supply-valve control unit 22a opens the second air supply valve 21b, adjusts the opening degree of the second air supply valve 21b according to the power demand value, and drives the expander 16 by the high-pressure compressed air in the high-pressure tank 15 to generate the required amount of power by increasing the amount of power generated by the generator 17. Alternatively, the air-supply-valve control unit 22a may open the second air supply valve 21b in a state where the first air supply valve 21a is closed.

The number-of-operating-units control unit 22b adjusts the number of expanders 16 to be operated, by switching the switching valve 21c, and drives the generator 17. Specifically, when the power demand value is larger than the current output power, the amount of power generated by the generator 17 is increased by opening the two outlets of the switching valve 21c and driving the two expanders 16. When the power demand value is smaller than the current output power, the amount of power generated by the generator 17 is decreased by closing one or all of the outlets of the switching valve 21c and driving one expander 16 or not driving the expander 16.

The rotational speed control unit 22c adjusts a rotational speed command value of the inverter 21d to drive the generator 17. Specifically, when the power demand value is larger than the current output power, the amount of power generated by the generator 17 is increased by increasing the rotational speed command value and increasing the rotational speed of the generator 17. When the power demand value is smaller than the current output power, the amount of power generated by the generator 17 is decreased by decreasing the rotational speed command value to decrease the rotational speed of the generator 17.

In these adjustments, assuming that the first air supply valve 21a and the second air supply valve 21b are adjusted, the adjustment of the switching valve 21c and the inverter 21d may be performed individually or in combination with a priority order. The control for the rotational speed of the generator 17 is not limited to that by the inverter 21d, and can be executed in any manner. Similarly, the control for the number of expanders 16 to be operated is not limited to that by the switching valve 21c, and can be executed in any manner. In particular, the number of expanders 16 is two at the maximum in the embodiment, but may be three or more.

According to the embodiment, energy of which the output fluctuates irregularly, such as renewable energy, can be stored as the compressed air in the low-pressure tank 14 and the high-pressure tank 15, and power can be generated by supplying the compressed air to the expander 16 as necessary and driving the generator 17. Further, since the power demand value of the consumer facility 3 is detected and received by the power demand detection unit 50 and the power demand receiving unit 60, it is possible to grasp a request for a temporarily large amount of power from the consumer facility 3 in a timely manner. Therefore, at the normal time, that is, when the power demand value is less than the predetermined threshold, it is possible to generate a required amount of power by adjusting the opening degree of the first air supply valve 21a and supplying a required amount of compressed air from the low-pressure tank 14 to the expander 16. Further, when there is a request for a temporarily large amount of power, that is, when the power demand value is equal to or greater than the predetermined threshold, it is possible to temporarily generate a large amount of power since a required amount of compressed air can be supplied from the high-pressure tank 15 to the expander 16 by adjusting the opening degree of the second air supply valve 21b. Accordingly, it is possible to respond to the request for a temporarily large amount of power from the consumer facility 3 by using the CAES power generation system 1. Here, the predetermined threshold of the power demand value is the maximum value of power that can be generated by the compressed air supplied from the low-pressure tank 14 to the expander 16. The power exceeding this threshold is not generated even when the first air supply valve 21a is opened to the maximum in a state where the second air supply valve 21b is closed. However, with the above-described configuration, it is possible to generate power exceeding the threshold by opening the second air supply valve 21b.

Specific examples of the power request as described above include, for example, a case where the consumer facility 3 is a supercomputer of a data center or the like or an electric furnace, or a case where an outage occurs in the consumer facility 3, and it is considered that in such a case, a temporarily large amount power is required as described above.

Further, with this configuration, given a case where the power demand value of the consumer facility 3 fluctuates, particularly given a case where the power demand value is increased only for a short time (for example, several minutes to several tens of minutes in one day), it is uneconomical to set contract power based on the increased power demand value. However, it is possible to set lower contract power by supplying power from the CAES power generation apparatus 10 in a timely manner in response to the increase in the power demand value in the short time. Accordingly, it is also useful from an economical viewpoint. Further, the CAES power generation apparatus 10 is excellent in environmental performance because it does not discharge environmentally hazardous substances, and has a long service life and excellent durability compared to other power generation facilities.

Further, according to the embodiment, it is possible to produce high-pressure compressed air by the second compressor and store this high-pressure compressed air in the high-pressure tank 15. Accordingly, it is possible to supply the high-pressure compressed air from the high-pressure tank 15 to the expander 16, and to generate more power.

In addition, according to the embodiment, since the opening degrees of the first air supply valve 21a and the second air supply valve 21b are adjusted according to the power demand value, it is possible to generate an amount of power required by the consumer facility 3 in a timely manner.

Moreover, according to the embodiment, since the rotational speed of the generator 17 is adjusted by the inverter 21d according to the power demand value, it is possible to generate an amount of power required by the consumer facility 3 in a timely manner.

Further, according to the embodiment, since the number of expanders to be driven is adjusted by the switching valve 21c according to the power demand value, it is possible to generate an amount of power required by the consumer facility 3 in a timely manner.

In the embodiment, since the second compressor 13 is provided, the pressure of the compressed air in the high-pressure tank 15 is higher than that of the compressed air in the low-pressure tank 14. However, the second compressor may not be provided and the compressed air in the high-pressure tank 15 and the compressed air in the low-pressure tank 14 may have the same pressure. In this case, the flow rate of the compressed air that can be supplied is increased by further opening the second air supply valve 21b together with the first air supply valve 21a. Accordingly, even in this case, it is possible to generate more power by opening the second air supply valve 21b.

Second Embodiment

Figure 3:
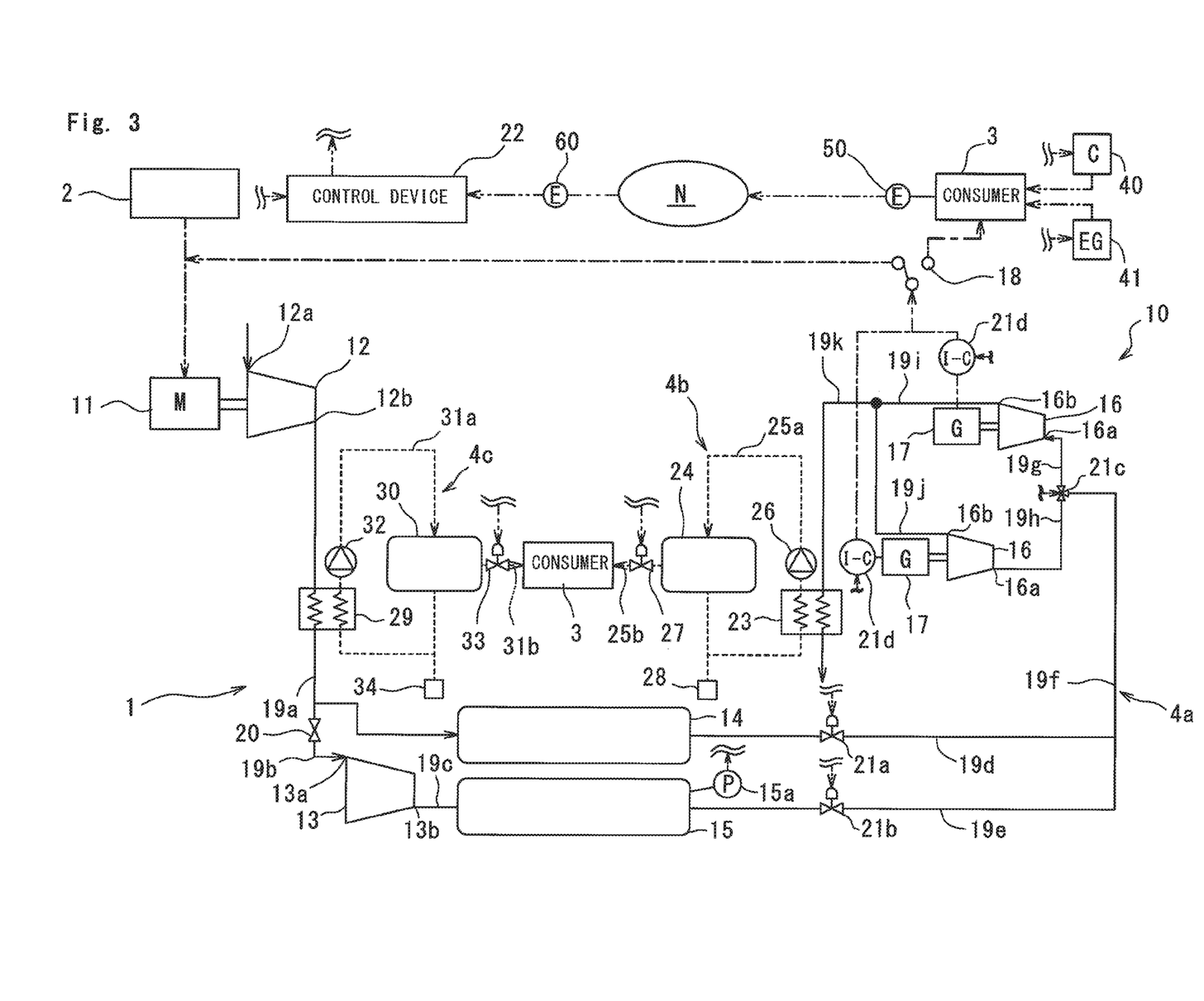
FIG. 3 is a schematic configuration diagram of a compressed air energy storage power generation apparatus according to a second embodiment.

The CAES power generation apparatus 10 of the second embodiment shown in FIG. 3 includes a pressure sensor (pressure detection unit) 15a that detects the internal pressure of the high-pressure tank 15, a capacitor 40 that stores power, and an engine generator 41 that generates power using fuel, in addition to the configuration of the first embodiment of FIG. 1. Except for a part relating to these components, the configuration is substantially the same as that of the first embodiment shown in FIG. 1. Accordingly, the same symbols are assigned to the same parts as the configuration shown in FIG. 1, and the description thereof is omitted.

In the CAES power generation apparatus 10 of the embodiment, the pressure sensor 15a is attached to the high-pressure tank 15, and the internal pressure of the high-pressure tank 15 can be detected. The detected internal pressure value of the high-pressure tank 15 is transmitted to the control device 22.

In the CAES power generation apparatus 10 of the embodiment, the capacitor 40 and the engine generator 41 are provided. The capacitor 40 and the engine generator 41 are electrically connected to the consumer facility 3, and power can be supplied from the capacitor 40 and the engine generator 41 to the consumer facility 3.

The capacitor 40 can obtain power from a power generation facility (not shown) and store the power. The capacitor 40 is electrically connected to the consumer facility 3, and can supply the stored power to the consumer facility 3. The supply of power from the capacitor 40 to the consumer facility 3 is controlled by the control device 22 as described later. Although not shown, the capacitor 40 may be supplied with power from, for example, the power generation apparatus 2 or the generator 17.

The engine generator 41 can generate power using fuel, and the type of engine is not particularly limited, and may be, for example, a diesel engine or a gas engine. The engine generator 41 is electrically connected to the consumer facility 3, and can supply the generated power to the consumer facility 3. The supply of power from the engine generator 41 to the consumer facility 3 is controlled by the control device 22 as described later.

Figure 4:
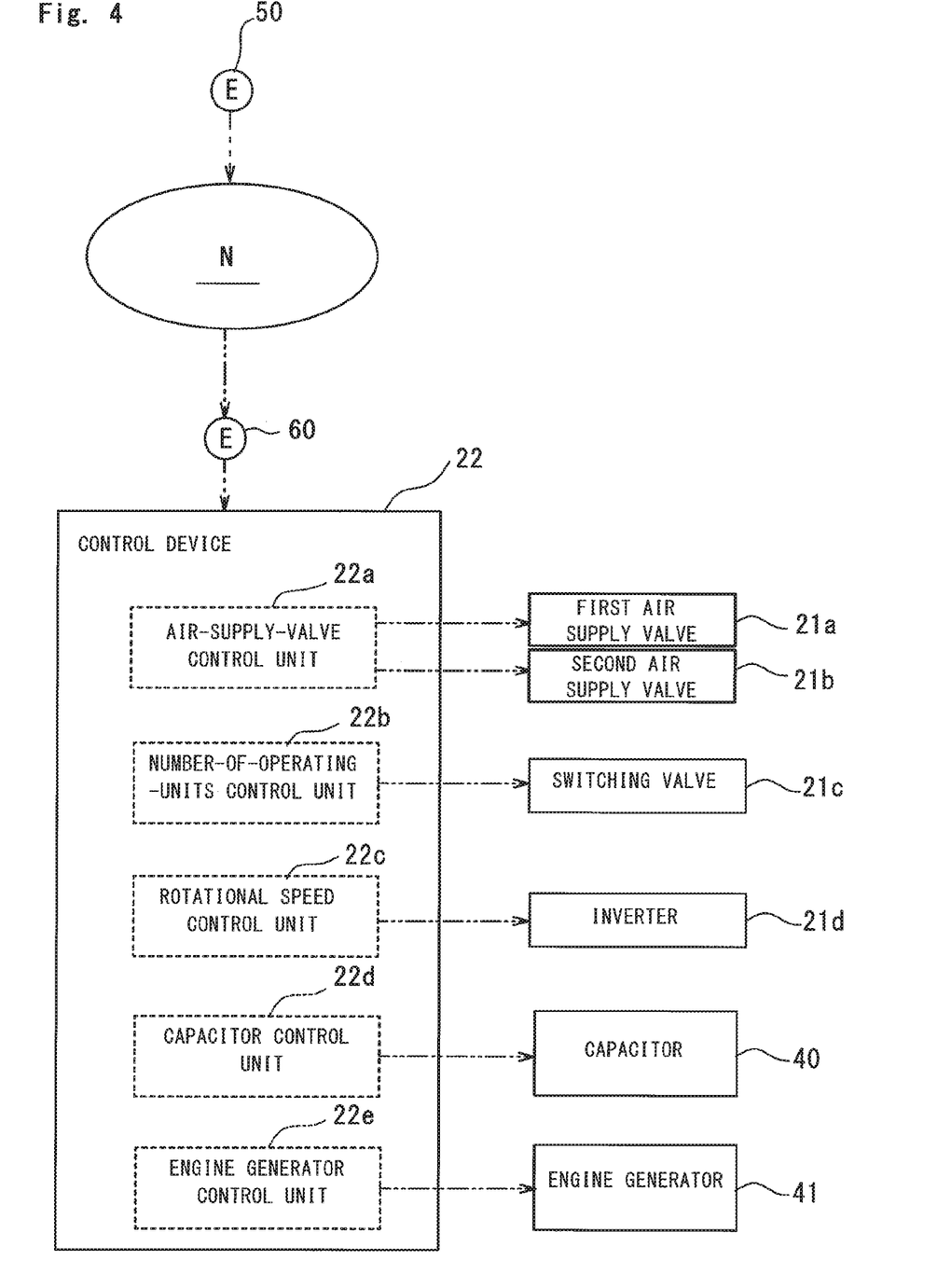
FIG. 4 is a control block diagram of the compressed air energy storage power generation apparatus according to the second embodiment.

Referring also to FIG. 4, the control device 22 includes the air-supply-valve control unit 22a, the number-of-operating-units control unit 22b, and the rotational speed control unit 22c, as in the first embodiment, and further includes a capacitor control unit 22d and an engine generator control unit 22e in the embodiment.

The capacitor control unit 22d controls the capacitor 40 according to the power demand value which is detected by the power demand detection unit 50 and is received by the power demand receiving unit 60, and the internal pressure of the high-pressure tank 15 detected by the pressure sensor 15a. Specifically, when the internal pressure of the high-pressure tank 15 detected by the pressure sensor 15a is equal to or lower than a predetermined pressure value, a required amount of power according to the power demand value is supplied from the capacitor 40 to the consumer facility 3. Further, when the internal pressure of the high-pressure tank 15 detected by the pressure sensor 15a is greater than the predetermined pressure value, the operation is not particularly performed. Here, the predetermined pressure value indicates a pressure value approximately equal to the internal pressure of the low-pressure tank 14 that is set to be allowed.

When the internal pressure of the high-pressure tank 15 detected by the pressure sensor 15a is equal to or lower than the predetermined pressure value and the power stored in the capacitor 40 is equal to or lower than a predetermined power value, the engine generator control unit 22e drives the engine generator 41 to supply power to the consumer facility 3. When the power stored in the capacitor 40 is greater than the predetermined power value, the operation is not particularly performed. Here, the predetermined power value indicates a power value at which power can be sufficiently supplied from the capacitor 40 to the consumer facility 3.

According to the embodiment, even when the compressed air in the high-pressure tank 15 is exhausted and a large amount of power cannot be generated temporarily, it is possible to supply power supplementarily from the capacitor 40 to the consumer facility 3. Furthermore, even when the stored power of the capacitor 40 is exhausted and the power cannot be supplied supplementarily, it is possible to generate power by the engine generator 41 and to supply the power supplementarily to the consumer facility 3.

In each of the embodiments described here, the target of power generation by renewable energy can be anything that uses energy replenished regularly (or repetitively) by the power of nature such as wind power, sunlight, solar heat, wave or tidal power, or flowing water or tide. Further, the input power of the invention is not limited to the power generated by the renewable energy, and may be surplus power or the like generated by plant facilities.

In the above-described embodiments, the compressor and the expander are separately provided, but the compressor may be reversely rotated to be used as an expander, and the single component may be used as both the compressor and the expander. In this case, the electric motor functions as the generator.

As described above, although specific embodiments of the invention have been described, the invention is not limited to the above-described forms, and various modifications can be implemented within the scope of the invention. For example, appropriate combinations of the contents of the respective embodiments may be an embodiment of the invention.

The invention claimed is:

1. A compressed air energy storage power generation apparatus configured to store input power in a form of compressed air, generate power by using the compressed air as necessary, and supply power to a consumer facility, the compressed air energy storage power generation apparatus comprising:
    a power demand receiving unit that receives a power demand value of the consumer facility;
    an electric motor that is driven by the input power;
    a first compressor that is driven by the electric motor;
    a first accumulation unit and a second accumulation unit that store the compressed air compressed by the first compressor;
    an expander that is driven by the compressed air supplied from the first accumulation unit or the second accumulation unit;
    a generator that is driven by the expander;
    a first air supply valve that adjusts a flow rate of the compressed air to be supplied from the first accumulation unit to the expander;
    a second air supply valve that adjusts a flow rate of the compressed air to be supplied from the second accumulation unit to the expander; and
    a control device configured to open the first air supply valve according to the power demand value in a state where the second air supply valve is closed when the power demand value is less than a predetermined threshold, and to open the second air supply valve according to the power demand value when the power demand value is equal to or greater than the predetermined threshold.

2. The compressed air energy storage power generation apparatus according to claim 1, further comprising:
a second compressor that performs compression up to a higher pressure than a pressure of the first compressor,
wherein the second accumulation unit has a higher allowable pressure than an allowable pressure of the first accumulation unit, and stores the compressed air compressed by the second compressor.

3. The compressed air energy storage power generation apparatus according to claim 1, further comprising:
a pressure detection unit that detects an internal pressure of the second accumulation unit;
a capacitor that stores power; and
an engine generator that generates power by using fuel,
wherein the control device is configured to supply power from the capacitor to the consumer facility according to the power demand value when the power demand value is equal to or greater than the predetermined threshold and when the internal pressure of the second accumulation unit is equal to or lower than a predetermined pressure value, and
supply power to the consumer facility by driving the engine generator according to the power demand value when the power demand value is equal to or greater than the predetermined threshold, when the internal pressure of the second accumulation unit is equal to or lower than the predetermined pressure value, and when the power stored in the capacitor is equal to or lower than a predetermined power value.

4. The compressed air energy storage power generation apparatus according to claim 1,
wherein the first air supply valve and the second air supply valve are flow regulating valves, and
the control device adjusts a power generation amount of the generator by adjusting opening degrees of the first air supply valve and the second air supply valve according to the power demand value.

5. The compressed air energy storage power generation apparatus according to claim 1, further comprising:
a rotational speed changing device that changes a rotational speed of the generator,
wherein the control device adjusts a power generation amount of the generator by adjusting the rotational speed of the generator by the rotational speed changing device according to the power demand value.

6. The compressed air energy storage power generation apparatus according to claim 1,
wherein a plurality of the expanders are provided,
the compressed air energy storage power generation apparatus further includes a number-of-operating-units changing device that changes the number of expanders to be operated, and
the control device adjusts a power generation amount of the generator by adjusting the number of expanders to be driven, by the number-of-operating-units changing device according to the power demand value.

7. The compressed air energy storage power generation apparatus according to claim 2, further comprising:
a pressure detection unit that detects an internal pressure of the second accumulation unit;
a capacitor that stores power; and
an engine generator that generates power by using fuel,
wherein the control device is configured to supply power from the capacitor to the consumer facility according to the power demand value when the power demand value is equal to or greater than the predetermined threshold and when the internal pressure of the second accumulation unit is equal to or lower than a predetermined pressure value, and
supply power to the consumer facility by driving the engine generator according to the power demand value when the power demand value is equal to or greater than the predetermined threshold, when the internal pressure of the second accumulation unit is equal to or lower than the predetermined pressure value, and when the power stored in the capacitor is equal to or lower than a predetermined power value.

8. The compressed air energy storage power generation apparatus according to claim 2,
wherein the first air supply valve and the second air supply valve are flow regulating valves, and
the control device adjusts a power generation amount of the generator by adjusting opening degrees of the first air supply valve and the second air supply valve according to the power demand value.

9. The compressed air energy storage power generation apparatus according to claim 2, further comprising:
a rotational speed changing device that changes a rotational speed of the generator,
wherein the control device adjusts a power generation amount of the generator by adjusting the rotational speed of the generator by the rotational speed changing device according to the power demand value.

10. The compressed air energy storage power generation apparatus according to claim 2,
wherein a plurality of the expanders are provided,
the compressed air energy storage power generation apparatus further includes a number-of-operating-units changing device that changes the number of expanders to be operated, and
the control device adjusts a power generation amount of the generator by adjusting the number of expanders to be driven, by the number-of-operating-units changing device according to the power demand value.

* * * * *